(12) United States Patent
Mithal

(10) Patent No.: US 9,944,435 B2
(45) Date of Patent: Apr. 17, 2018

(54) TWO-PIECE SPLASH AND SPILL RESISTANT LID ASSEMBLY AND METHOD THEREFOR

(71) Applicant: Waddington North America, Inc., Chelmsford, MA (US)

(72) Inventor: Ashish K Mithal, Chelmsford, MA (US)

(73) Assignee: Waddington North America, Inc., Chelmsford, MA (US)

( * ) Notice: Subject to any disclaimer, the term of this patent is extended or adjusted under 35 U.S.C. 154(b) by 23 days.

(21) Appl. No.: 14/995,239

(22) Filed: Jan. 14, 2016

(65) Prior Publication Data
US 2016/0198875 A1 Jul. 14, 2016

Related U.S. Application Data

(60) Provisional application No. 62/103,116, filed on Jan. 14, 2015.

(51) Int. Cl.
*A47G 19/22* (2006.01)
*B65D 43/02* (2006.01)
(Continued)

(52) U.S. Cl.
CPC ..... *B65D 43/0212* (2013.01); *A47G 19/2272* (2013.01); *B29C 65/02* (2013.01);
(Continued)

(58) Field of Classification Search
CPC .......... B65D 2543/00046; B65D 47/06; B65D 47/043; B65D 2547/063; B65D 43/0212;
(Continued)

(56) References Cited

U.S. PATENT DOCUMENTS

| 236,266 A | 1/1881 | Shirley |
|---|---|---|
| 622,564 A | 4/1899 | Tebbetts |

(Continued)

FOREIGN PATENT DOCUMENTS

| JP | 2010274965 A | 12/2010 |
|---|---|---|
| JP | 2012176800 A | 9/2012 |

OTHER PUBLICATIONS

PCT Search Report dated Apr. 1, 2016 of Patent Application No. PCT/US2016/013181 filed Jan. 13, 2016.
(Continued)

*Primary Examiner* — Shawn M Braden

(57) ABSTRACT

A 2-piece disposable lid assembly for a drinking cup enables unhindered drinking while inhibiting splashing and spilling. The assembly includes a dispensing well formed in a drinking spout, and a flat insert supported by a plurality of baffles within the spout so as to form a horizontal channel through which beverage flows in a circuitous path around the baffles and into the dispensing well. A plurality of vent holes can allow air to enter the cup as beverage is consumed. Vent holes located near the dispensing well can be blocked during drinking when the cup is full and the beverage is hot, but unblocked as the beverage cools and is consumed. Embodiments of the lid can also be used separately as a low-cost, 1-piece lid that reduces splashing. The flat insert is relatively inexpensive to manufacture, and installation of the insert in the lid can be automated.

17 Claims, 11 Drawing Sheets

(51) Int. Cl.
  B29C 65/48    (2006.01)
  B29L 31/56    (2006.01)
  B29C 65/08    (2006.01)
  B29C 65/56    (2006.01)
  B29C 65/60    (2006.01)
  B29C 65/00    (2006.01)
  B29C 65/02    (2006.01)

(52) U.S. Cl.
  CPC ............. B29C 65/08 (2013.01); B29C 65/48 (2013.01); B29C 65/565 (2013.01); B29C 65/606 (2013.01); B29C 66/1122 (2013.01); B29C 66/5346 (2013.01); B29C 66/61 (2013.01); B29L 2031/565 (2013.01); B65D 2543/00046 (2013.01); B65D 2543/0074 (2013.01); B65D 2543/00092 (2013.01); B65D 2543/00296 (2013.01); B65D 2543/00518 (2013.01); B65D 2543/00555 (2013.01); B65D 2543/00796 (2013.01)

(58) Field of Classification Search
  CPC ........ B65D 2543/0009; A47G 19/2272; B29C 65/02; B29C 65/08; B29C 65/48; B29C 65/565; B29C 65/606; B29C 66/1122; B29C 66/5346; B29C 66/61; B29L 2031/565
  USPC ........................................................ 220/713
  See application file for complete search history.

(56) References Cited

U.S. PATENT DOCUMENTS

| | | |
|---|---|---|
| 1,034,636 A | 8/1912 | McNair |
| D43,852 S | 4/1913 | Sanford |
| D52,727 S | 12/1918 | Beiswanger |
| 1,441,010 A | 1/1923 | McGuire |
| D69,040 S | 12/1925 | Loomis |
| D69,929 S | 4/1926 | Zimmerman |
| 1,629,358 A | 5/1927 | Padgett |
| D99,555 S | 5/1936 | Smith |
| D124,290 S | 12/1940 | Chaplin |
| 2,259,856 A | 10/1941 | Moore |
| D164,407 S | 9/1951 | Cowan |
| D174,832 S | 5/1955 | Nowak |
| 3,047,179 A | 7/1962 | Madej |
| D195,699 S | 7/1963 | Bostrom |
| 3,101,857 A | 8/1963 | Freedman |
| 3,546,752 A | 12/1970 | Sargent |
| 3,589,551 A | 6/1971 | Haggbom |
| 3,655,089 A | 4/1972 | Tower |
| 3,688,942 A | 9/1972 | Mitchell et al. |
| 3,693,847 A | 9/1972 | Gibson |
| 3,707,240 A | 12/1972 | Wilson |
| 3,889,842 A | 6/1975 | Bennett |
| 4,049,187 A | 9/1977 | Florian |
| 4,190,173 A | 2/1980 | Mason |
| 4,241,855 A | 12/1980 | Yoshioka |
| 4,322,014 A | 3/1982 | Philip |
| 4,331,255 A | 5/1982 | Fournier |
| 4,394,928 A | 7/1983 | Philip |
| 4,494,672 A | 1/1985 | Pearson |
| 4,503,992 A | 3/1985 | Sitko et al. |
| 4,589,569 A | 5/1986 | Clements |
| 4,615,459 A | 10/1986 | Clements |
| 4,619,372 A | 10/1986 | McFarland |
| 4,620,665 A | 11/1986 | McSherry |
| D287,207 S | 12/1986 | Daenen et al. |
| 4,684,024 A | 8/1987 | Ebrahim et al. |
| 4,687,117 A | 8/1987 | Terauds |
| 4,721,210 A | 1/1988 | Lawrence et al. |
| 4,753,365 A | 6/1988 | Seppala |
| 4,782,975 A | 11/1988 | Coy |
| 4,805,797 A | 2/1989 | Natori |
| 4,874,083 A | 10/1989 | Antoni et al. |
| 4,899,902 A | 2/1990 | Demars |
| 4,949,880 A | 8/1990 | Bradley |
| 4,986,438 A | 1/1991 | Borst |
| 5,050,758 A | 9/1991 | Freeman et al. |
| 5,054,640 A | 10/1991 | Tucker |
| 5,076,333 A | 12/1991 | Law |
| 5,125,525 A | 6/1992 | Tucker |
| 5,143,248 A | 9/1992 | Sawatsky |
| 5,203,467 A | 4/1993 | Tucker |
| 5,203,490 A | 4/1993 | Roe |
| 5,205,473 A | 4/1993 | Coffin, Sr. |
| 5,222,656 A | 6/1993 | Carlson |
| 5,240,132 A | 8/1993 | Tucker |
| 5,253,780 A | 10/1993 | Adado |
| 5,253,781 A | 10/1993 | Van Melle et al. |
| D344,210 S | 2/1994 | Cousisn et al. |
| D345,912 S | 4/1994 | Krupa |
| D346,554 S | 5/1994 | Krupa |
| 5,348,181 A | 9/1994 | Smith et al. |
| D352,000 S | 11/1994 | Hansen et al. |
| 5,363,978 A | 11/1994 | Molo |
| D353,519 S | 12/1994 | Wolfenden |
| 5,392,949 A | 2/1995 | McKenna |
| 5,398,843 A | 3/1995 | Warden |
| D358,091 S | 5/1995 | Warburton |
| 5,425,497 A | 6/1995 | Sorensen |
| D361,696 S | 8/1995 | Wolfenden |
| 5,441,166 A | 8/1995 | Lucas et al. |
| D364,090 S | 11/1995 | Krupa |
| 5,490,609 A | 2/1996 | Lane et al. |
| 5,509,582 A | 4/1996 | Robbins, III |
| 5,538,154 A | 7/1996 | Von Holdt |
| 5,538,157 A | 7/1996 | Proshan |
| 5,540,350 A | 7/1996 | Lansky |
| 5,542,670 A | 8/1996 | Morano |
| 5,553,701 A | 9/1996 | Jarecki et al. |
| D374,820 S | 10/1996 | Knoss et al. |
| 5,579,949 A | 12/1996 | Dykes et al. |
| 5,607,076 A | 3/1997 | Anthony |
| 5,613,619 A | 3/1997 | Van Melle |
| 5,613,720 A | 3/1997 | Shaddy |
| 5,624,053 A | 4/1997 | Freek et al. |
| 5,678,720 A | 10/1997 | Van Melle |
| 5,695,086 A | 12/1997 | Viola |
| D391,479 S | 3/1998 | Poitras |
| D391,850 S | 3/1998 | Krupa et al. |
| 5,752,646 A | 5/1998 | Sandstrom |
| 5,765,716 A | 6/1998 | Cai et al. |
| 5,772,111 A | 6/1998 | Kirsch |
| 5,820,016 A | 10/1998 | Stropkay |
| 5,839,601 A | 11/1998 | Van Melle |
| 5,894,952 A | 4/1999 | Mendenhall et al. |
| D411,714 S | 6/1999 | Wilson et al. |
| D413,487 S | 9/1999 | Vitali |
| D414,413 S | 9/1999 | Brown |
| 5,947,323 A | 9/1999 | Freek et al. |
| 5,979,697 A | 9/1999 | Kim |
| D415,024 S | 10/1999 | McCann |
| D415,025 S | 10/1999 | McCann |
| 5,960,987 A | 10/1999 | Solland et al. |
| D416,445 S | 11/1999 | Henry |
| 5,979,689 A | 11/1999 | Lansky |
| D420,285 S | 2/2000 | Sagan et al. |
| D420,854 S | 2/2000 | Michaeli |
| D421,202 S | 2/2000 | Demers |
| 6,089,397 A | 7/2000 | Van Melle |
| D435,197 S | 12/2000 | Wellner |
| 6,176,390 B1 | 1/2001 | Kemp |
| 6,199,711 B1 | 3/2001 | Lansky |
| 6,216,904 B1 | 4/2001 | Cagan |
| 6,260,727 B1 | 7/2001 | Durdon |
| 6,296,141 B1 | 10/2001 | Lukacevic |
| 6,305,571 B1 | 10/2001 | Chu |
| D450,537 S | 11/2001 | Hayes |
| D450,538 S | 11/2001 | Benson |
| 6,311,863 B1 | 11/2001 | Fleming |
| 6,318,584 B1 | 11/2001 | Milan |
| 6,325,236 B1 | 12/2001 | Wong |

(56) References Cited

U.S. PATENT DOCUMENTS

| | | | |
|---|---|---|---|
| D457,037 S | 5/2002 | Haynes | |
| 6,419,105 B1 | 7/2002 | Bruce et al. | |
| D461,678 S | 8/2002 | Haynes | |
| 6,431,390 B1 | 8/2002 | Waller | |
| 6,488,173 B2 * | 12/2002 | Milan | B65D 47/043 215/387 |
| 6,533,139 B2 | 3/2003 | Lukacevic | |
| 6,578,726 B1 | 6/2003 | Schaefer | |
| 6,612,456 B1 | 9/2003 | Hundley et al. | |
| 6,644,490 B2 | 11/2003 | Clarke | |
| 6,679,397 B2 | 1/2004 | Smith et al. | |
| 6,702,145 B2 | 3/2004 | Malcolm | |
| 6,732,875 B2 | 5/2004 | Smith et al. | |
| 6,755,318 B2 | 6/2004 | Burke | |
| 6,811,049 B2 * | 11/2004 | Lukacevic | B65D 43/0212 220/254.3 |
| 6,874,649 B2 | 4/2005 | Clarke et al. | |
| 6,889,859 B1 | 5/2005 | Leon | |
| 6,889,860 B2 | 5/2005 | Mazzarolo | |
| 6,923,337 B2 | 8/2005 | Hession et al. | |
| 6,929,143 B2 | 8/2005 | Mazzarolo | |
| 6,991,128 B1 * | 1/2006 | Russo | B65D 43/0212 220/713 |
| 7,032,773 B2 | 4/2006 | Dees et al. | |
| 7,063,224 B2 | 6/2006 | Clarke et al. | |
| 7,086,549 B2 | 8/2006 | Kosmyna et al. | |
| 7,100,790 B2 | 9/2006 | Dark | |
| 7,111,749 B1 | 9/2006 | Akers | |
| 7,131,551 B2 | 11/2006 | Smith | |
| 7,134,566 B2 | 11/2006 | Smith et al. | |
| 7,134,570 B1 | 11/2006 | Heath et al. | |
| 7,156,251 B2 | 1/2007 | Smith et al. | |
| 7,178,685 B2 | 2/2007 | Hidalgo et al. | |
| 7,246,715 B2 | 7/2007 | Smith et al. | |
| 7,757,886 B2 | 7/2010 | Ho | |
| 7,959,029 B2 | 6/2011 | Whitaker et al. | |
| 7,980,432 B2 | 7/2011 | Brannon et al. | |
| 8,052,003 B2 | 11/2011 | Burns | |
| D659,465 S | 5/2012 | Burns | |
| D660,077 S | 5/2012 | Burns | |
| D673,809 S | 1/2013 | Burns | |
| 9,387,961 B2 * | 7/2016 | Mithal | B65D 43/0212 |
| 2002/0011494 A1 | 1/2002 | Lukacevic | |
| 2002/0038803 A1 | 4/2002 | Malcolm | |
| 2002/0096530 A1 | 7/2002 | Waller | |
| 2003/0089713 A1 | 5/2003 | Belt et al. | |
| 2004/0232154 A1 | 11/2004 | Smith et al. | |
| 2005/0072787 A1 | 4/2005 | Morris | |
| 2005/0087539 A1 | 4/2005 | Waller | |
| 2005/0098581 A1 | 5/2005 | Long et al. | |
| 2005/0173443 A1 | 8/2005 | Crudgington, Jr. | |
| 2005/0205587 A1 | 9/2005 | Sampson et al. | |
| 2005/0267425 A1 | 12/2005 | Castora et al. | |
| 2006/0006184 A1 | 1/2006 | Bohman et al. | |
| 2006/0096983 A1 | 5/2006 | Patterson | |
| 2006/0124645 A1 | 6/2006 | Peitersen | |
| 2006/0249476 A1 | 11/2006 | Albers et al. | |
| 2007/0012710 A1 | 1/2007 | Vovan | |
| 2007/0131691 A1 | 6/2007 | Evans | |
| 2008/0011762 A1 | 1/2008 | Boone | |
| 2008/0041862 A1 * | 2/2008 | Bal | B65D 43/0212 220/711 |
| 2008/0054027 A1 | 3/2008 | Skillin et al. | |
| 2008/0156802 A1 | 7/2008 | Yauk et al. | |
| 2008/0156817 A1 | 7/2008 | Roseblade et al. | |
| 2009/0050641 A1 | 2/2009 | Ivey | |
| 2009/0065518 A1 | 3/2009 | Carnevali | |
| 2009/0108006 A1 | 4/2009 | Milan | |
| 2009/0294460 A1 | 12/2009 | Hovsepian et al. | |
| 2010/0065588 A1 | 3/2010 | Brannon et al. | |
| 2010/0108701 A1 | 5/2010 | Lee et al. | |
| 2010/0133272 A1 * | 6/2010 | Whitaker | B65D 43/0212 220/254.1 |
| 2012/0199584 A1 | 8/2012 | Pensak | |
| 2012/0312827 A1 | 12/2012 | Zuares | |
| 2014/0299614 A1 | 10/2014 | Mithal | |
| 2016/0198876 A1 * | 7/2016 | Mithal | A47G 19/2211 220/713 |

OTHER PUBLICATIONS

PCT Search Report, PCT Application No. PCT/US2006/040392, dated May 8, 2007, 3 pages.

PCT Search Report, PCT Application No. PCT/US2009/068265, dated Feb. 4, 2010, 1 page.

Cardinal Glassware, Arcoroc, Cardinal International, 30 Corporate Drive, Wayne, NJ 07470 (6 pages) pp. 84 and 85 of Catalog.

PCT Search Report & Written Opinion, PCT Application No. PCT/US2014/032925, dated Aug. 5, 2014, 12 pages.

PCT Search Report dated Mar. 29, 2016 of Patent Application No. PCT/US2016/013319 filed Jan. 14, 2016.

* cited by examiner

TWO-PIECE SPLASH AND SPILL RESISTANT LID ASSEMBLY AND METHOD THEREFOR

RELATED APPLICATIONS

This application claims the benefit of U.S. Provisional Application No. 62/103,116, filed Jan. 14, 2015, which is herein incorporated by reference in its entirety for all purposes.

FIELD OF THE INVENTION

This invention relates to lids for use with drinking vessels, and more particularly to splash and spill resistant lids for drinking vessels which may be disposable or reusable.

BACKGROUND OF THE INVENTION

Drinking cups, coffee cups, and other types of drinking vessels and cups from which a beverage can be consumed, are frequently used in combination with a cooperating lid adapted for attachment to the cup rim. Some lid designs require removal of the lid from the drinking vessel for consuming the beverage contained therein. However, most commercial drinking cup lids today feature a drink-through opening which allows a user to consume the beverage contained in the drinking vessel without removing the lid therefrom. Note that herein the terms "cup" and "vessel" are used generically to refer to all types of vessels, cups, and containers from which a beverage may be consumed.

Commonly used coffee cup lids typically feature a drink-through opening proximate to the perimeter of the lid in the form of a small, unobstructed aperture or hole within the lid that allows a person to drink coffee or another beverage without removing the lid from the cup. In addition, at least one separate vent hole is often included in a disposable lid so as to allow air to enter the cup and equalize the pressure inside the cup as the beverage is consumed.

While providing a drink-through opening in a coffee cup lid facilitates consumption of the beverage without separating the lid from the drinking vessel, it also creates a risk that beverage could be inadvertently splashed or spilled out through the opening if the cup is inadvertently tipped or jostled, or is subjected to sudden acceleration or deceleration. These situations are often encountered when the cup or other drinking vessel is being transported, whether by hand, within a cup holder in a moving vehicle, or while walking, climbing stairs, or traveling in an elevator or escalator.

Inadvertent spilling and splashing can create dangerous situations when a user is driving or moving. With today's busy lifestyle, consumption of beverages on-the-go has become commonplace, and inadvertent spilling and splashing of a beverage can be particularly irksome and embarrassing for a user when en route to work or to a professional and/or social engagement. The term "spilling" as generally used herein refers to inadvertent flowing of a beverage out of a cup or drinking vessel, and the term "splashing" as generally used herein refers to the inadvertent ejection or scattering from a cup of beverage droplets or modest quantities of beverage that become airborne due to sudden and/or rapid movement or halting of the drinking vessel.

It will be appreciated by those skilled in the art that lids for use with cold beverages such as sodas often include holes that fit snuggly around drinking straws, whereby the length of the straw effectively prevents splashing and spilling. However, straws are typically not practical, or at least are not preferred, when consuming a hot beverage such as tea, coffee, or hot chocolate.

Lids designed for use with hot beverages sometimes include small holes or flaps near their rims that can be opened for drinking. However, turbulence or "sloshing" of a beverage when the cup has substantial quantities of beverage therein can easily lead to spilling of some liquid out from the hole, and jostling of the cup can cause liquid to splash or spill through such a hole or flap.

A drainage well is sometimes provided in a disposable lid so that small amounts of liquid that do spill or splash inadvertently from the drinking orifice (or through a vent hole) will pool in a designated region of the lid and drain back into the cup. However, such drainage wells are typically shallow, and are only effective if the cup is maintained in a near-vertical orientation. In certain situations, additional jostling may even cause liquid to splash or spill out of the drainage well before it has drained back into the cup.

A drinking hole or orifice is sometimes placed at the top of a raised spout, so as to reduce the likelihood that liquid will spill or splash from the drinking hole. However, since the drinking hole is in the direct path of a beverage splash, liquid is still able to splash through the drinking hole if the cup is shaken or jostled with sufficient force, for example if the beverage is being consumed while traveling in a vehicle and the vehicle drives over a rough road, a speed bump, a pot hole, or some other uneven feature in the road (such as train tracks), or is forced to brake or maneuver suddenly.

Various types of lids for use with drinking cups that feature closable drinking orifices or spouts have been proposed in the art, and some of them are in commercial use. One such lid construction includes a rotatable second piece that can seal the drinking orifice, so that the drinking orifice can be opened and closed by sliding the rotatable second piece to alternate between open and closed positions. Another lid construction includes a connected or tethered cap or plug that can be used to seal the drinking orifice. Still another approach for preventing spills and splashes from the drinking orifice involves placing an adhesive sticker on the drinking orifice (see U.S. Pat. No. 7,111,749).

Yet another approach involves using a drinking cup with a traditional lid having a drinking orifice, and equipping the cup-lid combination with a separate plug device having a handle end for grasping and a narrow elongated end that is inserted in the drinking cup through the drinking orifice in the lid for temporarily sealing the drinking orifice during transportation or until the user is ready to consume the beverage. See for example U.S. Pat. No. 8,052,003, D660,077, D659,465 and D673,809). Once the user is ready to consume the beverage, the plug device is removed by pulling on its exposed handle-end and simply discarded.

These approaches, however, only provide protection from spilling and splashing when the drinking orifice is closed or blocked, and do not naturally inhibit spilling and splashing when open. Furthermore, when the drinking orifice is closed or blocked it also prevents a user from consuming the beverage. In addition, it is too cumbersome and burdensome for a user to repeatedly plug and unplug the drinking orifice manually each time a portion of beverage is to be consumed. Accordingly, once a user has unplugged the drink-through opening, the lid essentially tends to function as an open-spout lid and does not provide splash protection when resting unplugged or during use or consumption of the beverage. Also, it will be appreciated by those of ordinary skill that these lid solutions tend to be multi-piece constructions, which may be generally more expensive to produce than a one-piece construction lid, and may require an assembly step after forming or molding the lid.

One approach for inhibiting splashing and spilling without using a plug or cap is to provide barriers or baffles in a one-piece lid that allow flow of liquid for drinking while inhibiting splashing by blocking direct paths from the liquid out through the opening. Examples are presented in published co-pending application Ser. No. 12/639,649 to Whitaker (US Pat. Pub. 20100133272) and Ser. No. 14/245,116 to Mithal (US Pat. Pub. 20140299614), both of which are assigned to the assignee of the present invention.

Another approach is to provide a two-piece or multi-piece lid assembly comprising a separate insert that can be placed either on a cup or underneath a lid, wherein the separate insert has fluid passages that are not aligned with the drinking and vent openings in the lid, thereby preventing straight-line travel by splashed, airborne droplets from the cup interior through a lid opening, and forcing the beverage to flow through a convoluted path before exiting through the lid (see for example U.S. Pat. Nos. 5,540,350, 5,979,689, 6,305,571, 6,318,584, 6,533,139, 6,811,049 and 7,959,029).

However, while a two-piece lid assembly can provide good splash resistance, it presents some practical hurdles. If the insert and the lid are required to be installed by a consumer, then it may be inconvenient and cumbersome for the consumer. Also, separate inserts can become dislodged or can shift in position, and can therefore be unreliable. This is true even if the insert is loosely attached to the lid or separately attached to the rim of the cup. On the other hand, if this solution is implemented by a lid manufacturer, it necessarily raises the cost of the lid, since manufacturing involves providing and installing a separate insert within a lid as part of a secondary operation.

A two-piece splash and spill resistant lid is described in U.S. Pat. No. 7,959,029 to Whitaker et al. (Whitaker '029). The two-piece design of Whitaker '029 inhibits all direct paths of beverage flow through the spout opening when the cup is upright, and thereby significantly reduces the likelihood that beverage will splash or spill. However, the design of the two pieces is complex, and therefore expensive to produce. Among other things, the insert piece and the outer lid have to be molded or formed in separate molding or forming operations, and then combined to deliver a splash resistant lid assembly. An additional shortcoming that has been observed with the two-piece assembly according to Whitaker '029 is that the insert often tends to fall off into the cup after some time if it is not firmly attached to the lid.

What is needed, therefore, is an improved splash and spill resistant drinking cup lid that enables a user to consume a beverage through the lid while inhibiting inadvertent spilling and splashing of the beverage from the cup, without requiring deployment of manual plugs or blocking devices, and while minimizing production costs, due to an easily produced lid structure and due to elimination of a need to maintain two separate product lines. These and other needs, as shall hereinafter appear, are met by the device of the present invention.

SUMMARY OF THE INVENTION

As discussed above, the splash resistant lid constructions in the prior art fall into either of two categories, namely a one-piece construction with a constricted spout area, or a two-piece construction with an insert attached to a relatively non-splash resistant, open-spout, outer lid. In practice, different consumers and buyers have different preferences as to the optimal trade-off between the degree of splash and spill prevention versus the cost of the lid, thus potentially requiring a manufacturer to offer both a lower cost, one-piece lid with modest splash resistance and a higher cost, two-piece lid for greater splash resistance. In order to offer a range of splash resistant lids, this requires a manufacturer to support two separate product lines, and to invest in at least three molds, including a first mold for a one-piece lid with a constricted spout, a second mold for the outer lid of the two-piece lid assembly, and a third mold for the insert of the two-piece lid assembly.

An insight that enabled the present invention was the realization that splash resistant lid offerings could be improved and simplified by providing a common or "universal" outer lid that can serve as both a one-piece, splash-resistant lid and as the outer lid body of a two-piece splash-resistant lid. It was further realized that the construction of the insert could be simplified by obviating the need for molding or forming the insert in a separate mold, and thereby obviating the need for a separate insert mold.

The present invention is a lid assembly comprising a lid and a lid insert. The disclosed lid assembly inhibits spilling and splashing of beverages, while minimizing production costs due to a simplified design that allows the lid to be inexpensively produced and the insert to be cut or stamped out of a flat sheet of material at a relatively low cost compared to molding or forming it separately.

The disclosed lid includes a drinking spout, a dispensing well formed in the drinking spout, and a bottom wall which serves as an integral splash barrier at the bottom of the dispensing well that reduces or eliminates straight-line paths between the dispensing well and a contained beverage. The lid further includes baffles on either side of the dispensing well that serve as barriers to any liquid traveling along the inside of the spout toward the dispensing well, and thereby further reduce the volume of splashed fluid that may find a pathway to the dispensing well openings. The lid is thereby able to function by itself as a one-piece, splash-resistant lid suitable for users who wish to reduce cost as much as possible.

In embodiments, the dispensing well includes a pair of opposing, substantially vertical side openings of approximately the same size, wherein one of the side openings is proximate the spout front or outer wall and one of the side openings is proximate the spout back or inner wall. When used as a one-piece lid, the two side openings of the dispensing well, in combination with the bottom wall, provide a synergistic effect in various splash circumstances. In particular:

(1) beverage splashes resulting from a certain volume of fluid rising upwardly from its normal level in the cup impinge on the bottom wall of the dispensing well and are deflected back into the cup;

(2) if a certain volume of splashed beverage emerges from the first opening it can, at least partially, flow through the second opening and drain back into the cup, rather than the entire volume being splashed out of the dispensing well;

(3) if a certain volume of splashed beverage emerges from the second opening it can, at least partially, flow through the first opening and drain back into the cup, rather than the entire volume being splashed out of the dispensing well; and (4) if a certain volume of splashed beverage emerges from both the first and second openings concurrently, then the flow fronts through the first and second openings impinge against each other and reverse direction, such that a substantial quantity of the beverage drains back into the cup. This splash possibility is analogous to momentum transfer when two balls traveling in opposing directions collide against each other and reverse directions.

When the lid and the insert are assembled, the baffles in the spout serve as supporting spacers for the insert, and ensure that beverage can flow to the spout opening, but only by a circuitous path. This eliminates any need for molding, forming, or shaping of the insert, and allows the insert to be cut or stamped out of a flat sheet of material at a minimal cost. Due to the simplified design and flat nature of the insert, it is also feasible to automate the assembly of the lid with the insert for economical mass manufacturing. Fastening of the insert to the lid can be accomplished by any means known in the art, such as by gluing, heat staking, plastic welding, or ultrasonic or laser bonding. In embodiments, orienting posts extending from the underside of the lid and inserted into corresponding holes in the insert can serve to maintain the proper alignment of the two pieces, and welding of the tops of the posts can provide secure attachment between the lid and the insert pieces. The two-piece lid assembly with the thermally fastened insert thereby provides a cost-effective manufacturing solution with a high degree of spill and splash resistance.

Various embodiments include one or more vent holes in the lid that permit air to enter the cup and equalize the internal pressure as a beverage is consumed. Certain of these embodiments include a plurality of vent holes. In some of these embodiments, the plurality of vent holes includes vent holes of different sizes that are selectively located so as to control the maximum rate at which a beverage can flow from the cup.

In some embodiments designed to hold hot beverages, one or more vent holes are located in proximity to the drinking spout or the dispensing well, so that when the cup is full and the beverage in the cup is hot, tipping of the cup from vertical beyond a certain angle causes the beverage to block vent holes near the dispensing well, thereby reducing the rate of liquid flow out of the cup. It will be appreciated by those skilled in the art that a typical user tilts the cup towards his or her mouth to consume the beverage therefrom, and has a tendency to consume the beverage in smaller sips when the beverage is hot. Thus, blocking of some of the vent holes when the cup is full complements the natural tendency of the user to consume beverage at a slower rate when the cup is full and the beverage is hot. As the cup is emptied and the beverage cools, the level of liquid falls, and some of the previously blocked vent holes are uncovered, thereby increasing the liquid flow rate.

And in various embodiments, a plurality of different insert sizes and designs can be produced and then combined with lids according to customer requirements. For example, smaller inserts that cover only subsets of the lid baffles can be installed in lids in place of larger inserts that cover all of the baffles.

In another general aspect of the present invention, where the lid is primarily intended for use in a two-piece configuration, or where splash-resistance is not of interest for the outer lid when used alone, the design of the outer lid is further simplified by omitting part or all of the bottom wall of the dispensing well. In these embodiments, the flat insert in the two-piece lid assembly takes the place of the bottom wall of the dispensing well, and blocks all direct paths from the interior of the container through the dispensing well. Accordingly, in some embodiments the dispensing well comprises two end walls projecting towards the interior of the cup and terminating in mounting posts for receiving the insert. In other embodiments, at least one of the end walls can be shaped in the form of an end post or stem that terminates into a mounting post for receiving the insert. In still other embodiments, the dispensing well structure is replaced with a drink opening and the mounting provisions for the flat insert are disposed at proximate locations on either side of the drink opening. The mounting provisions for the flat insert may also serve as baffles for providing a tortuous path for the beverage flow before it emerges from the drink opening.

One general aspect of the present invention is a lid assembly for use with a drinking vessel. The lid assembly includes a lid having a peripheral rim configured for engaging with said drinking vessel, a drinking spout extending upward from the lid, a dispensing well formed within said drinking spout, said drinking spout and said dispensing well being configured for allowing consumption of a beverage contained within an interior of said drinking vessel by a user, a splash barrier provided at a bottom of the dispensing well, at least one opening disposed in a side of the dispensing well, said opening being configured for allowing the beverage to flow from the interior of the drinking vessel into the dispensing well when the drinking vessel is tipped for drinking, a plurality of baffles located on at least one internal surface of the drinking spout, at least one of the baffles being located on each side of the splash barrier, and a lid insert fixed within an interior of the drinking spout, the lid insert providing a channel beneath the lid insert through which the beverage can flow horizontally from the interior of the drinking vessel into the dispensing well.

In embodiments, a width of said lid insert substantially spans an internal width of said drinking spout, forming a liquid seal with opposing internal walls of the drinking spout. In some embodiments, the at least one opening is formed by an absence of a side wall of the dispensing well. In various embodiments, the at least one opening includes an opening on each of opposing sides of the dispensing well.

Certain embodiments further include at least one vent hole that provides air communication between the interior of the drinking vessel and air exterior to the lid. Some embodiments further include a plurality of vent holes that admit air into the interior of the drinking vessel as the beverage in the drinking vessel is consumed. In some of these embodiments, at least a first vent hole amongst the plurality of vent holes is located proximate said dispensing well. In various of these embodiments, the plurality of vent holes includes a plurality of vent hole sizes.

Embodiments further include a plurality of vent holes located at a plurality of locations offset from the dispensing well, wherein at least one vent hole amongst said plurality of vent holes is blocked by said beverage when the drinking vessel is full of beverage and is tipped from an upright position.

Various embodiments further include at least one locating pin extending from the bottom of the dispensing well, end wall, end post, baffle, or lid towards the interior of the drinking vessel and through a corresponding hole provided in said lid insert. And in some of these embodiments, the lid insert is fixed within the drinking spout by a shaped feature provided at the end of the at least one locating pin, said shaped feature being configured to prevent the lid insert from being removed from the locating pin.

In embodiments, the lid insert is fixed within the drinking spout by an adhesive. In some embodiments, the lid is constructed from at least one of paper, plastic, thermoplastic resin, foam, a laminated material, a compostable resin, and a biodegradable material.

In various embodiments, the lid is manufactured by one of thermoforming, injection molding, compression molding, vacuum forming, pressure forming, and hydro forming. In other embodiments, the lid is injection molded from a suitable grade of polypropylene resin. In still other embodiments, the lid is injection molded from a plastic material.

In certain embodiments the baffles are offset in an alternating pattern that forces the beverage to flow around the baffles in a serpentine path toward the dispensing well.

In some embodiments the lid assembly is disposable. In various embodiments, the lid assembly is compatible for use with a drinking vessel that is configured for holding and dispensing a drinkable fluid that is one of tea, coffee, soup, shake, juice, and milk.

Another general aspect of the present invention is a method for providing a splash resistant lid assembly for use with a drinking vessel. The method includes forming a lid having a peripheral rim configured for engaging with said drinking vessel, said lid having a drinking spout extending upward from the lid and a dispensing well formed within said drinking spout, said drinking spout and said dispensing well being configured for allowing consumption of a beverage contained within an interior of said drinking vessel by a user, forming at least two mutually opposed openings in the dispensing well, said openings being configured for allowing the beverage to flow from the interior of the drinking vessel into the dispensing well when the drinking vessel is tipped for drinking, forming at least two protrusions in said dispensing well, forming at least one baffle located on each side of the dispensing well on the interior surface of the lid, providing a substantially flat arcuate lid insert with two holes, said lid insert being configured for assembly with said lid by accommodating said two protrusions within said two holes, and assembling said lid and said insert by locally bonding said lid and said lid insert by one of ultrasonic bonding, heat staking, gluing, and welding.

Embodiments further include forming a plurality of flat arcuate lid inserts that differ from each other in at least one of size and shape, and selecting one of the inserts to be assembled with said lid.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

The present invention is generally directed towards a lid that engages with a drinking cup or a similar vessel and allows a user to drink therefrom while naturally inhibiting splashing and spilling of beverage from the drinking cup without requiring use of an orifice sealing device or plug, and without requiring the user to plug and unplug the drinking orifice with a connected or separate plug member. The following description of one or more exemplary embodiments, in conjunction with accompanying drawings of representative lids, is offered as illustrative of the invention, but should not be regarded as restricting the scope of the invention.

As noted elsewhere, the lid constructions according to various embodiments of the invention offer particular utility for disposable drinking cups, which are typically used for holding cold and hot beverages and are generally constructed from paper, plastic, or foam materials. It will be apparent to those skilled in the art that the lid embodiments described herein can also be utilized and/or adapted for reusable cups and drinking vessels made from plastic, foam or other materials. Depending on the embodiment, the lid of the present invention can be utilized for consuming all kinds of hot and cold beverages, including coffee, tea, soup, shakes, frappes, and slush drinks. The lid of the present invention can also be used in combination with disposable or reusable cups for children of all ages. According to still other embodiments of the invention, the lid spout and dispensing well constructions can be used for dispensing consumable liquids such as salad dressing, vinegar, coffee cream, etc.

Figure 1:
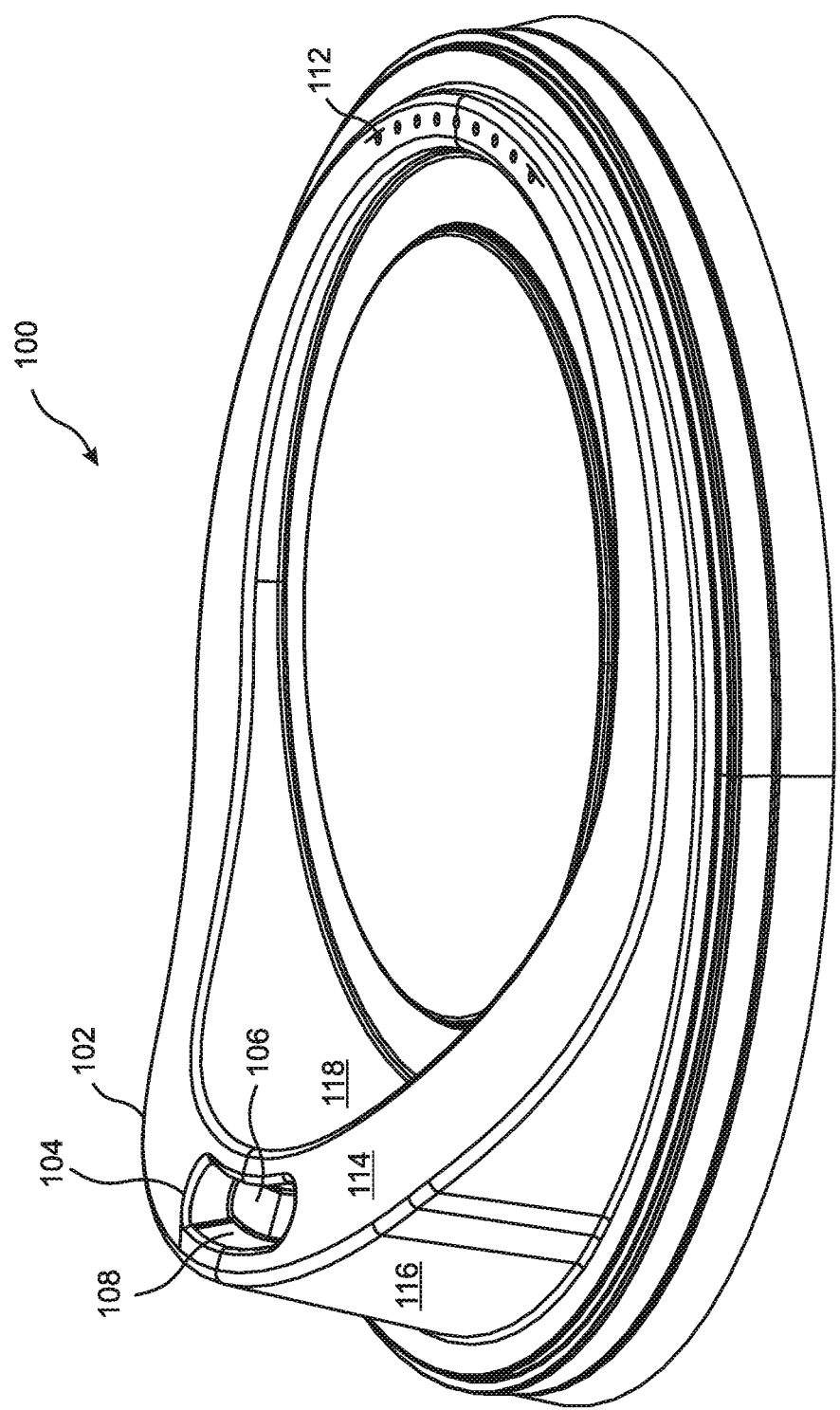
FIG. 1 is a perspective side view of a lid in an embodiment of the present invention that includes a plurality of vent holes located about the periphery of the lid opposite to the drinking spout.

With reference to the perspective top view of FIG. 1, there is shown lid 100 according to an embodiment of the present invention. Lid 100 is designed to be securely but removably attachable along the periphery of a drinking cup (not shown) as is known in the art. Lid 100 includes a raised drinking spout 102 that allows a user to comfortably accommodate his/her lips around the drinking spout 102, a dispensing well 104, a splash barrier or bottom wall at the bottom of the dispensing well 106, and dispensing well openings 108 and 110 located in the side walls of the dispensing well. A plurality of vent holes 112 are provided along the rim opposite the spout 102, thereby ensuring that none of the vent holes 110 will be blocked by liquid as the liquid is consumed, even when the cup is full of liquid. The drinking spout 102 comprises a top wall 114, outer spout wall 116 and inner spout wall 118.

Figure 2A:
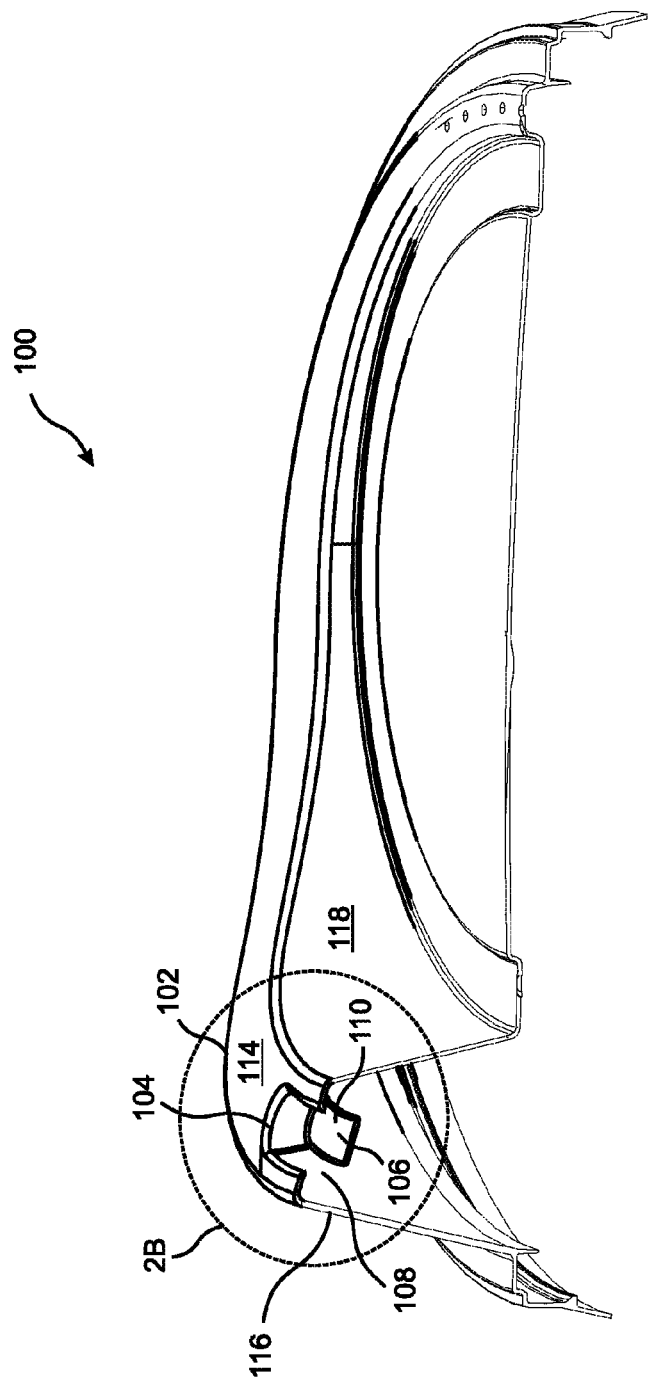
FIG. 2A is a sectional side view of the lid of FIG. 1.
Figure 2B:
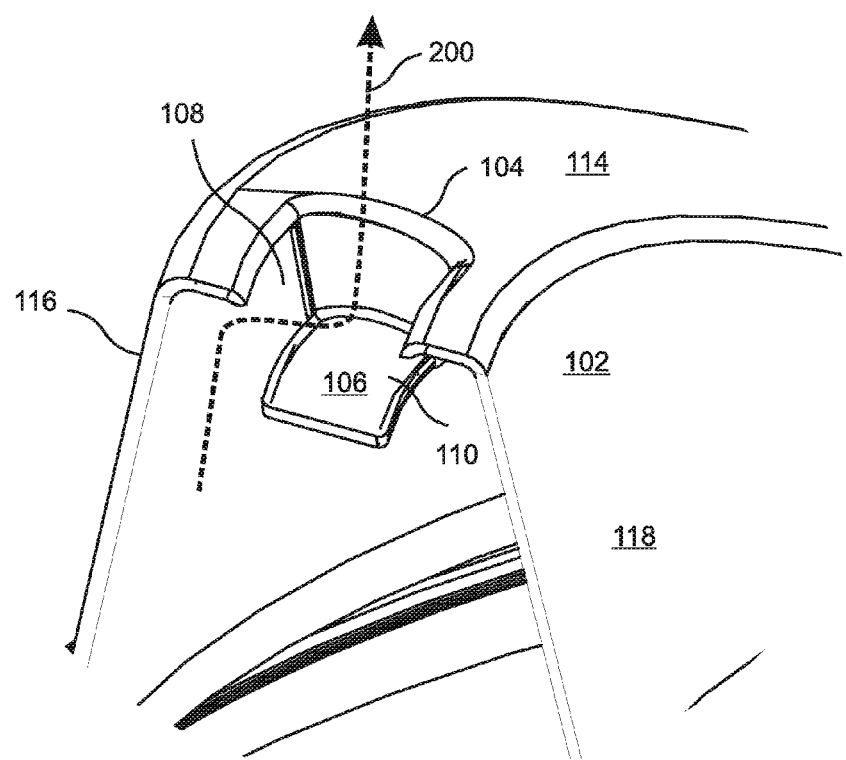
FIG. 2B is an enlarged sectional view of the spout region of FIG. 2A.

FIG. 2A is a sectional view of the lid of FIG. 1, showing the relative arrangement of the dispensing well 104, splash barrier or bottom wall 106, and side openings 108 and 110. FIG. 2B is a close-up sectional illustration of the spout region of the lid of FIG. 2A. A dotted line 200 in FIG. 2B illustrates the indirect path that a liquid must follow to flow from the interior of the cup out through the dispensing well.

Figure 3A:
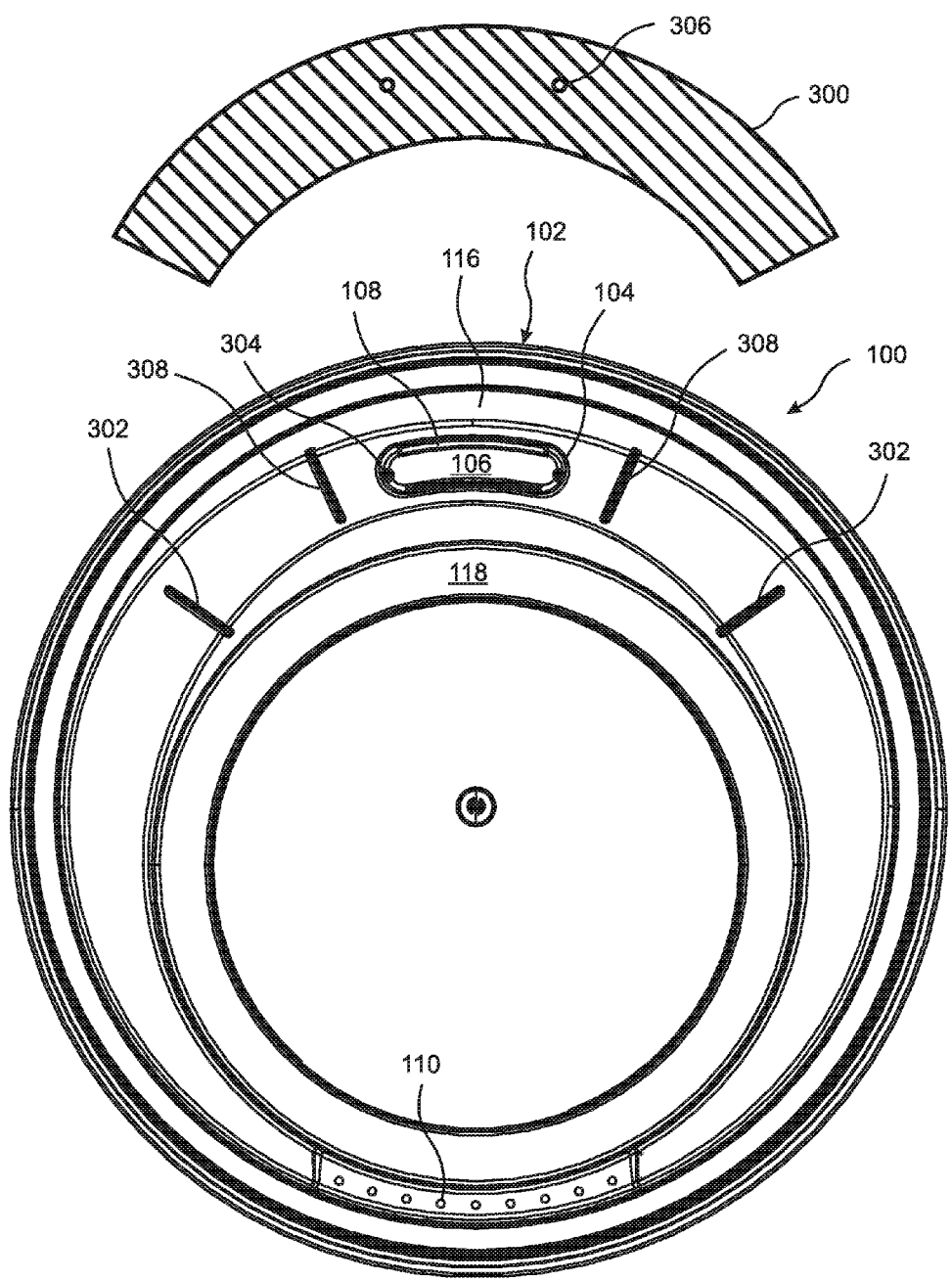
FIG. 3A is a bottom view of an embodiment of the present invention, showing the flat insert separately positioned above the lid.

While the lid 100 shown in FIGS. 1 through 2B can be used by itself as a low cost, one-piece, splash-inhibiting lid, the present invention provides for improved performance by combining lid 100 with an insert. With reference to FIG. 3A, lid 100 is shown with a relatively flat lid insert 300 that, upon suitable assembly with the lid, further inhibits spilling and splashing of beverages from the lid. Due to its simplified design the insert 300 can be cost effectively cut or stamped out of a flat sheet of material.

Figure 3B:
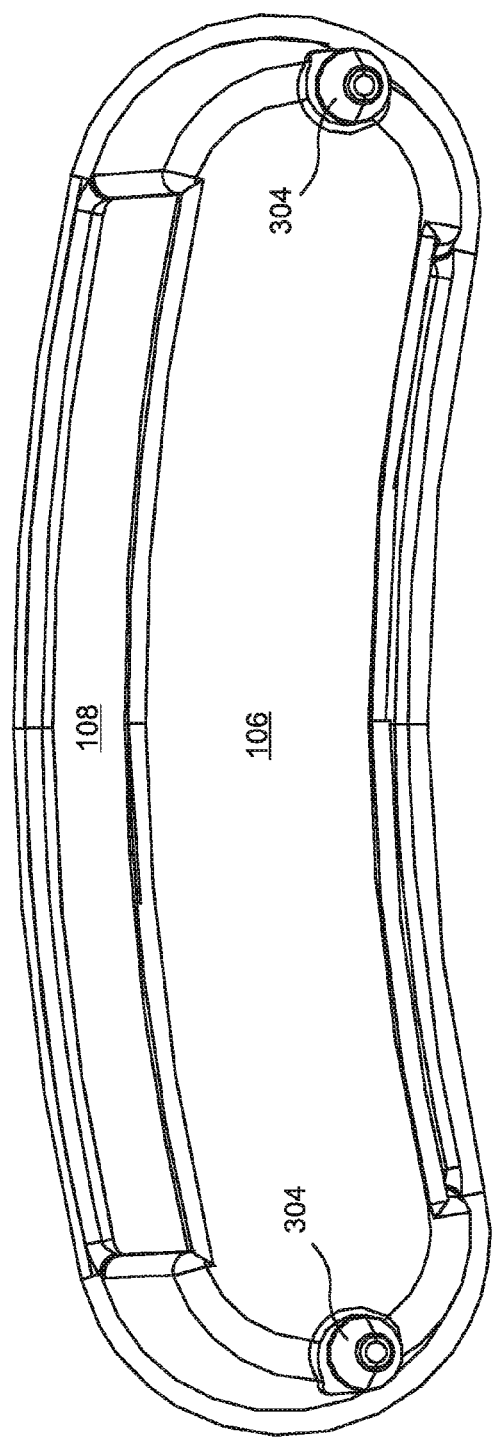
FIG. 3B is a close-up bottom view of the splash barrier and dispensing well of FIG. 3A, showing the orienting posts in more detail.

FIG. 3A includes a bottom view of the lid of FIG. 1. It can be seen in the figure that the lid 100 further includes baffles 308 emanating from outer spout wall 116 on either side of the dispensing well 104. Similarly, baffles 302 emanating from inner spout wall 118, are provided on either side of the dispensing well 104. If the lid 100 is used alone as a one-piece lid, the baffles 302 and 308 serve as barriers to any liquid traveling along the inside of the spout 102 toward the dispensing well 104. It can also be seen in the figure that orienting posts 304 are provided on the left and right ends of the splash barrier 106, and that corresponding orienting holes 306 are provided in the flat insert 300. FIG. 3B is a close-up view of the dispensing well of FIG. 3A, showing the splash barrier 106 and orienting posts 304 in closer detail. It will be realized by those skilled in the art that only one set of baffles 302 or 308 can be employed according to an embodiment of the invention, and can be straight or curved and configured in a variety of orientations relative to the inner and outer spout walls.

Figure 3C:
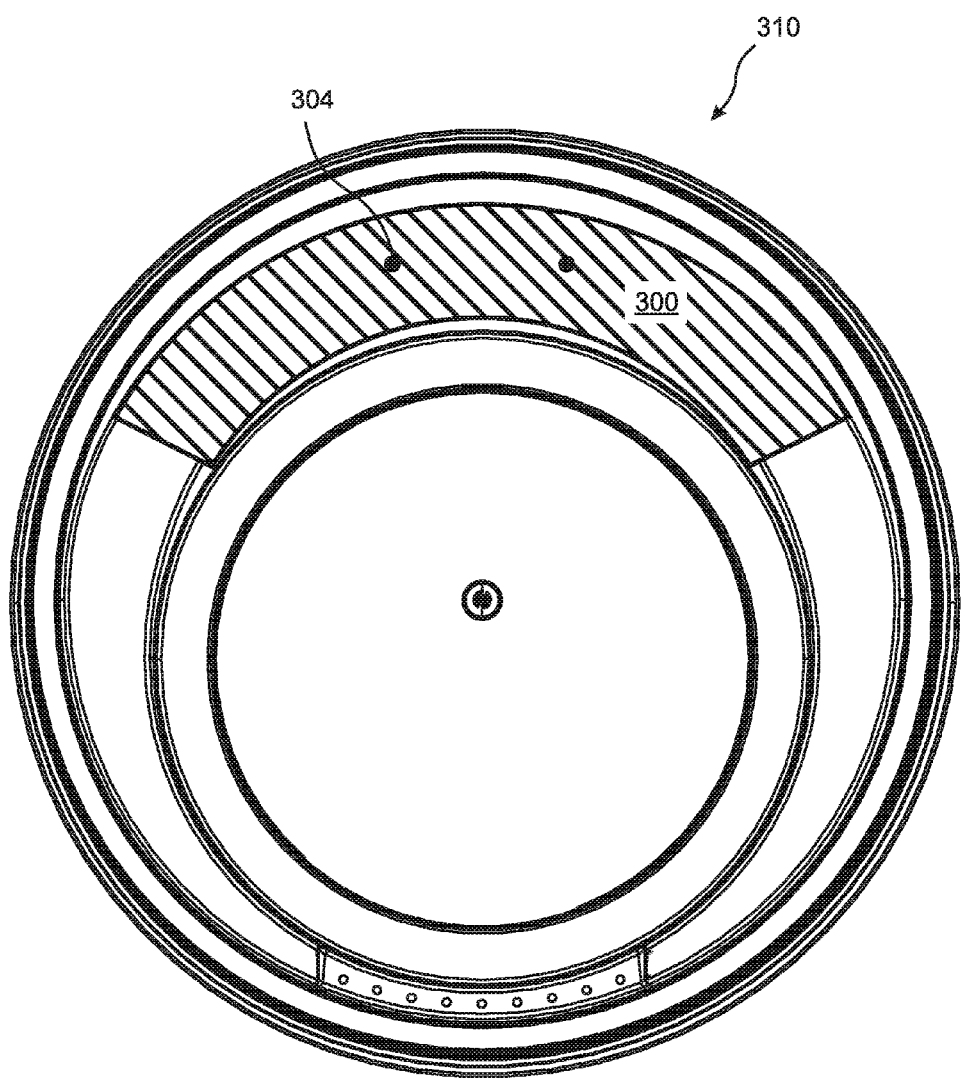
FIG. 3C is a bottom view of the assembled lid and insert of FIG. 3A.

FIG. 3C is a bottom view of the lid 100 of FIG. 3A, shown with the lid insert 300 installed in the spout 102 of the lid 100. When the lid 100 and the insert 300 are assembled together, the baffles 302 and 308 in the spout 102 serve as supporting spacers for the insert 300, and ensure that beverage can flow through a channel in between the insert and the lid to the dispensing well 102, but only by a circuitous path around the baffles 302 and 308. This eliminates any need for shaping of the insert 300, and allows the insert 300 to be cut or stamped out of a flat sheet of material at a minimal cost. Assembly of the lid 100 with the insert 300 is easily automated, due to the simple design. Fixed attachment of the insert 300 to the lid 100 can be accomplished by any means known in the art, such as by press fitting, gluing, ultrasonic bonding, heat staking or plastic welding.

In the embodiment of FIG. 3C, the orienting posts 304 serve to maintain proper alignment of the two pieces 100, 300, and welding of the tops of the posts provides attachment between the pieces 100, 300. The lid assembly 310 thereby provides a cost-effective two-piece solution with a high degree of spill and splash resistance.

Figure 4:
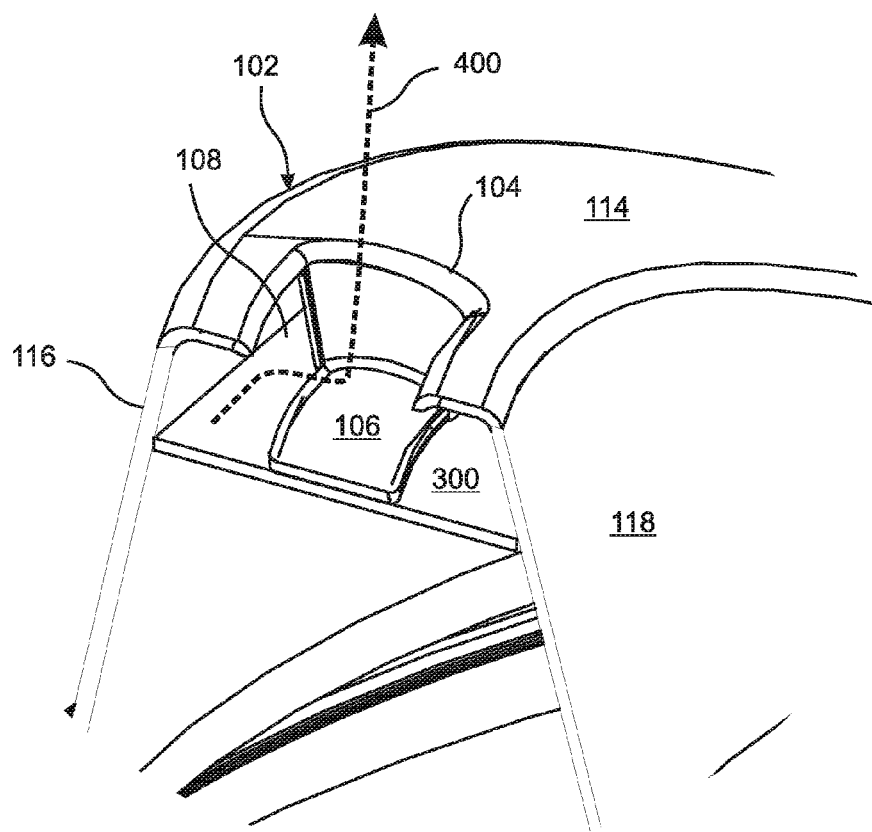
FIG. 4 is an enlarged sectional side view of the spout region of FIG. 3C.
Figure 5:
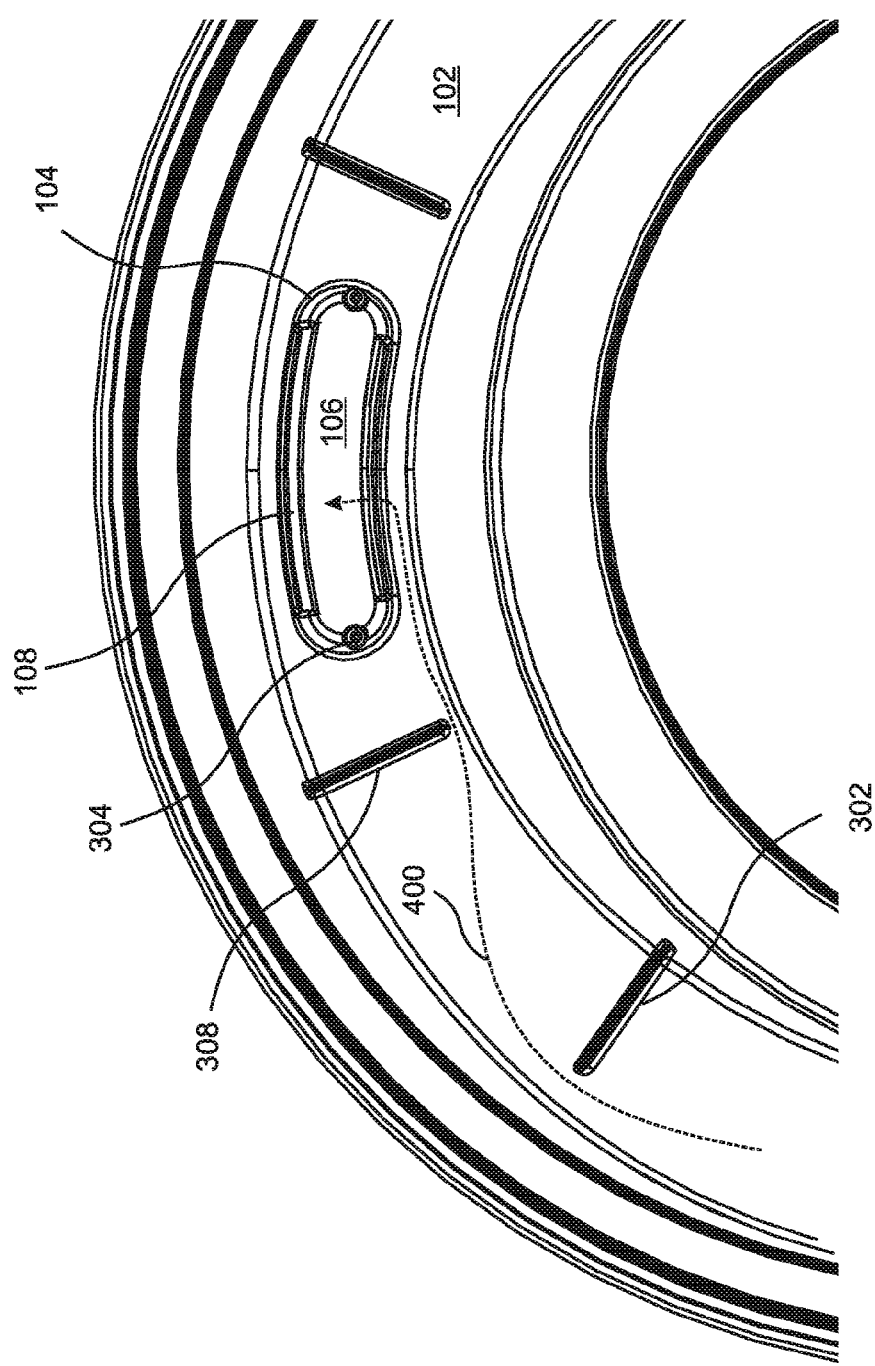
FIG. 5 is an enlarged bottom view of the spout region of FIG. 3C, shown without the insert.

FIG. 4 is a close-up sectional view of the spout of FIG. 3C, similar to FIG. 2B, but showing the lid insert 300 installed in the lid 100. The dashed line 400 in the figure illustrates the circuitous path that liquid must follow to flow from the interior, along the channel between the lid 100 and the insert 300 and out through the dispensing well 104. FIG. 5 is an enlarged bottom view of a portion of the lid 100 of FIG. 3C, but with the insert removed. The dashed line illustrates the liquid path 400 winding around the baffles 302 and 308 on its way to the dispensing well 104.

Figure 6:
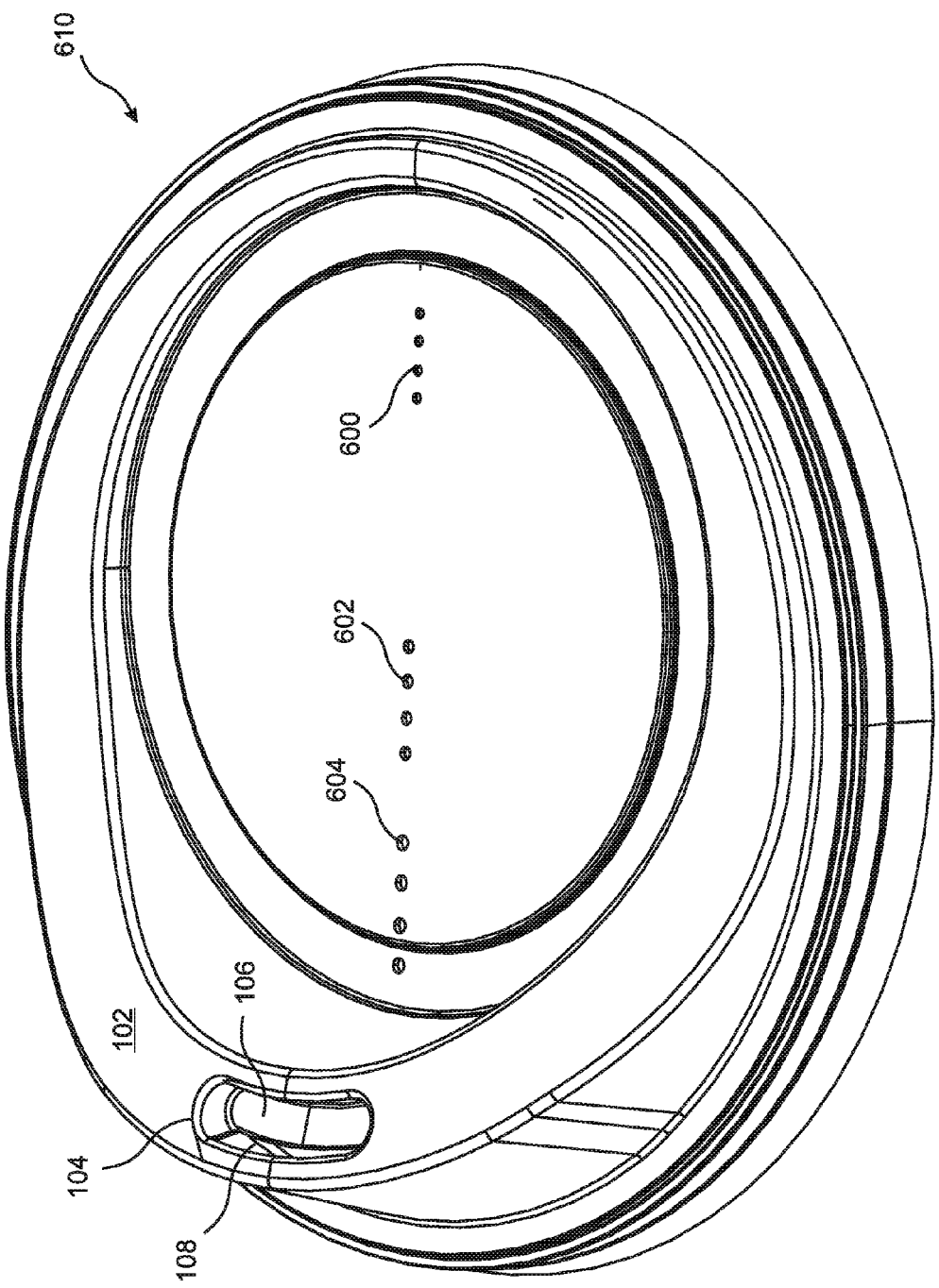
FIG. 6 is a perspective top view of an embodiment in which the lid includes groups of vent holes of varying sizes and at varying distances from the spout.

As mentioned above, various embodiments include one or more vent holes 112 in the lid that permit air to enter the cup and equalize the internal pressure as a beverage is consumed. With reference to FIG. 6, certain of these embodiments 610 include a plurality of vent holes 600, 602, 604 of different sizes that are selectively located so as to control the maximum rate at which a beverage can flow from the cup. In the embodiment of FIG. 6, one group of small vent holes 600 is located near the rim of the lid 100 in a region opposite the spout 102, a second group of intermediate size vent holes 602 is located closer to the spout 102, and a third group 604 of larger vent holes is positioned near to the spout.

The embodiment of FIG. 6 is especially advantageous when used with hot beverages. When the cup is full and the beverage in the cup is hot, tipping of the cup from vertical beyond a certain angle will cause the beverage to block the vent holes 602, 604 near the dispensing well, thereby reducing the rate of liquid flow out of the cup. It will be appreciated by those skilled in the art that a typical user tilts the cup towards his or her mouth to consume the beverage therefrom, and has a tendency to consume the beverage in smaller sips when the beverage is hot. Thus, initially blocking of some of the vent holes 602, 604 complements the natural tendency of the user to consume beverage at a slower rate when the cup is full and the beverage is hot. As the cup is emptied and the beverage cools, the level of liquid falls, and the second group 602 of vent holes is uncovered, allowing the liquid to flow more quickly. Finally, when even more liquid has been consumed, and the liquid has cooled even further, the third group of vent holes 604 is uncovered, thereby increasing the liquid flow rate to its maximum.

Figure 7A:
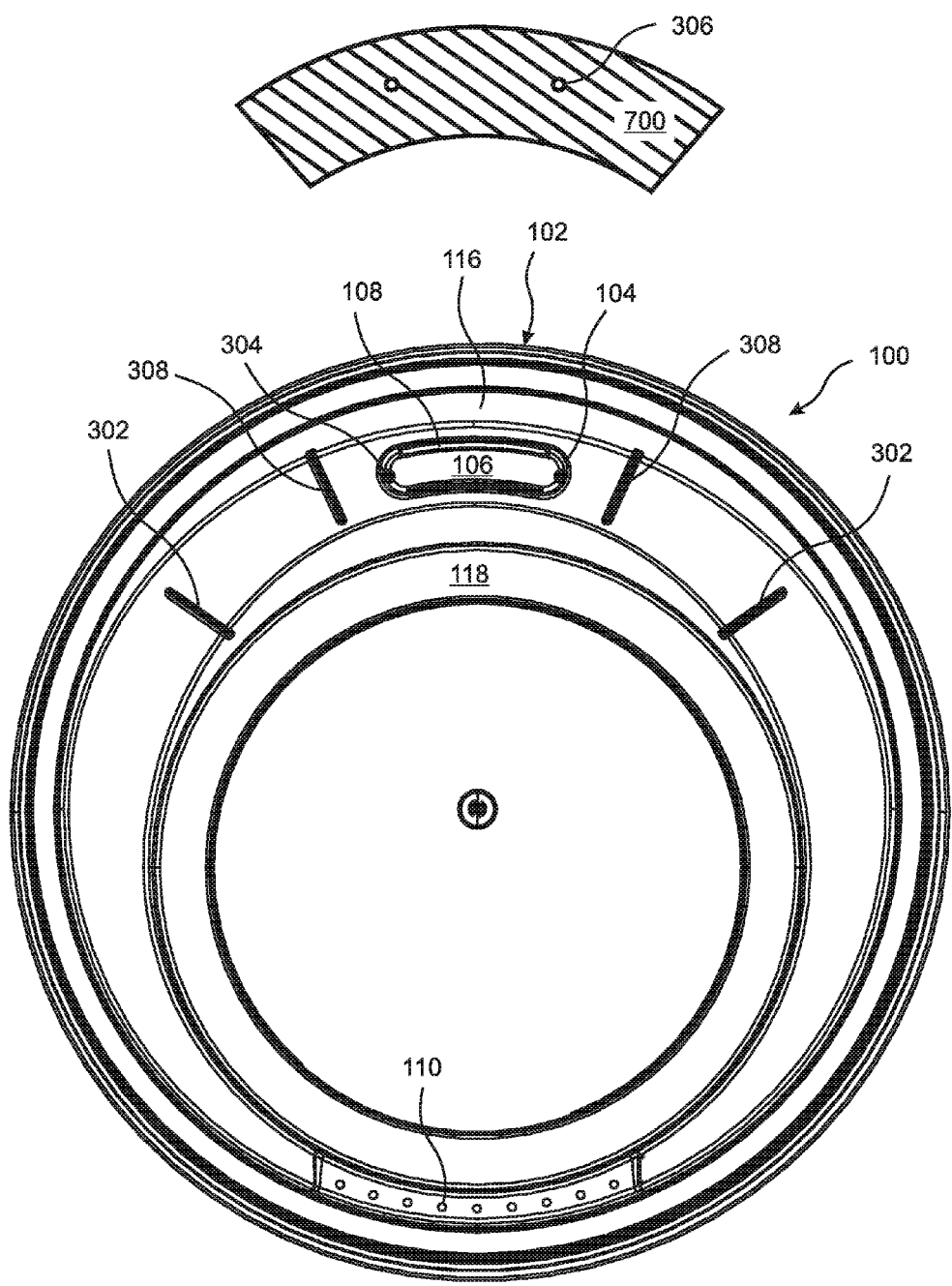
FIG. 7A is a bottom view of an embodiment of the present invention similar to FIG. 3A, but shown together with a smaller insert configured to cover a subset of the baffles.
Figure 7B:
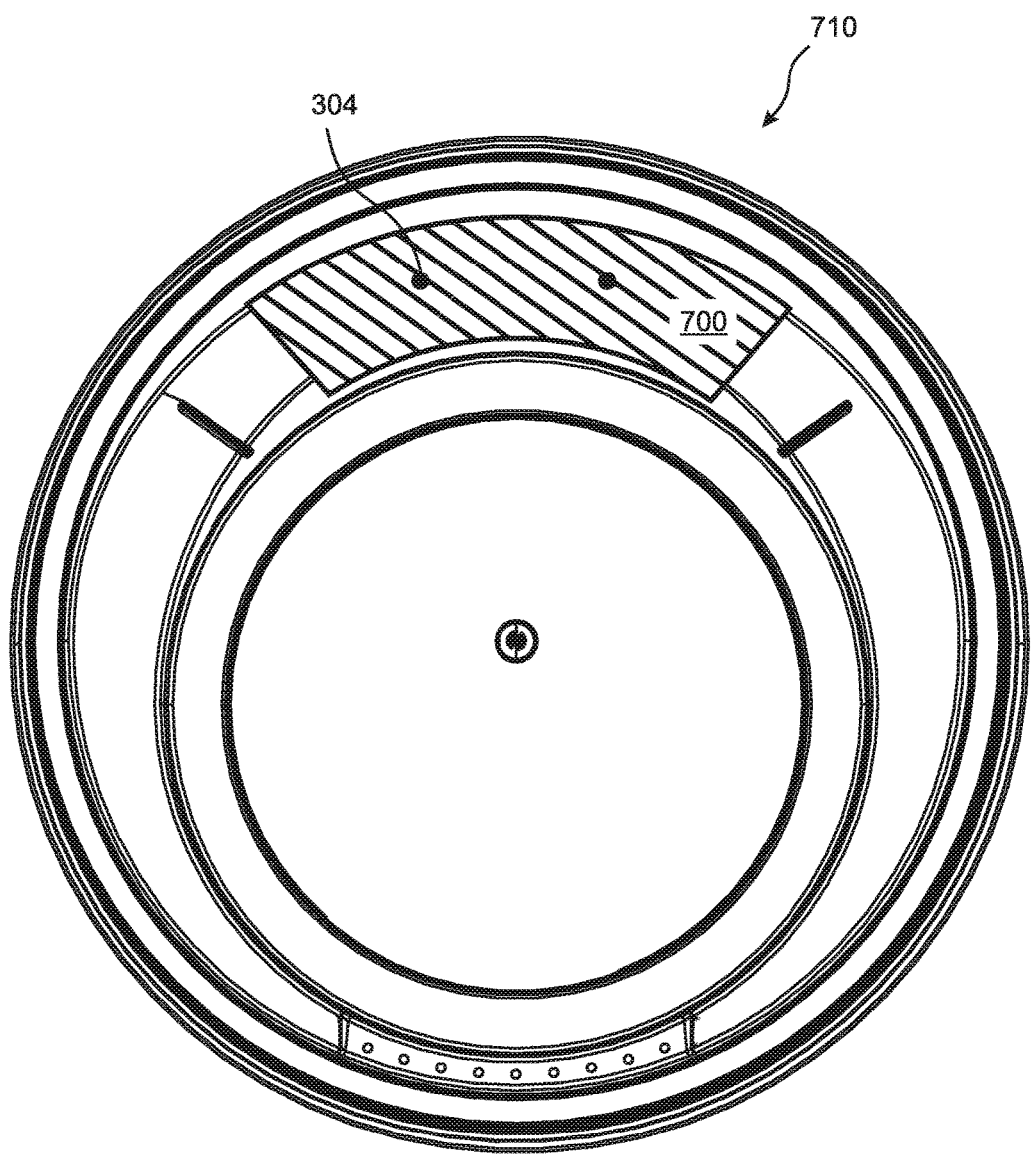
FIG. 7B is a bottom view of the assembled lid and insert of FIG. 7A.

In various embodiments, a plurality of different insert sizes and designs are produced and then combined with lids according to customer requirements. As described above in conjunction with FIGS. 3A and 3C, insert 300 covers both sets of baffles 302 and 308. For example, with reference to FIG. 7A, there is shown an alternate embodiment with a smaller insert 700 that covers only a subset 308 of the lid baffles and can be installed in a lid 100 instead of a larger insert 300 that covers all of the baffles 308, 302. The assembled lid 710 with the smaller insert is shown in FIG. 7B.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. A lid assembly for use with a drinking vessel, said lid assembly comprising:
   a lid having a peripheral rim configured for engaging with said drinking vessel;
   a drinking spout extending upward from the lid;

a dispensing well formed within said drinking spout, said drinking spout and said dispensing well being configured for allowing consumption of a beverage contained within an interior of said drinking vessel by a user;

a splash barrier provided at a bottom of the dispensing well;

at least one opening disposed in a side of the dispensing well, said opening being configured for allowing the beverage to flow from the interior of the drinking vessel into the dispensing well when the drinking vessel is tipped for drinking;

a plurality of baffles located on at least one internal surface of the drinking spout, at least one set of the baffles being located on each side of the splash barrier; and a lid insert fixed within an interior of the drinking spout to the bottom of the splash barrier of the dispensing well, the lid insert being configured to extend beyond the periphery of the dispensing well and contacting said at least one set of the baffles, the lid insert providing a circuitous path that the beverage must follow to flow from the interior of the drinking vessel along a channel between the lid and the insert and out through the dispensing well.

2. The lid assembly of claim 1, wherein a width of said lid insert substantially spans an internal width of said drinking spout, forming a liquid seal with opposing internal walls of the drinking spout.

3. The lid assembly of claim 1, wherein said at least one opening is formed by an absence of a side wall of the dispensing well.

4. The lid assembly of claim 1, wherein said at least one opening includes an opening on each of opposing sides of the dispensing well.

5. The lid assembly of claim 1, further comprising at least one vent hole that provides air communication between the interior of the drinking vessel and air exterior to the lid.

6. The lid assembly of claim 1, further comprising a plurality of vent holes that admit air into the interior of the drinking vessel as the beverage in the drinking vessel is consumed.

7. The lid assembly of claim 1, further comprising at least one locating pin extending from the bottom of the dispensing well or lid towards the interior of the drinking vessel and through a corresponding hole provided in said lid insert.

8. The lid assembly of claim 7, wherein the lid insert is fixed within the drinking spout by a shaped feature provided at the end of the at least one locating pin, said shaped feature being configured to prevent the lid insert from being removed from the locating pin.

9. The lid assembly of claim 1, wherein the lid insert is fixed within the drinking spout by an adhesive.

10. The lid assembly of claim 1, wherein said lid is constructed from at least one of paper, plastic, thermoplastic resin, foam, a laminated material, a compostable resin, and a biodegradable material.

11. The lid assembly of claim 1, wherein said lid is manufactured by one of thermoforming, injection molding, compression molding, vacuum forming, pressure forming, and hydro forming.

12. The lid assembly of claim 1, wherein said lid is injection molded from a suitable grade of polypropylene resin.

13. The lid assembly of claim 1, wherein said lid is injection molded from a plastic material.

14. The lid assembly of claim 1, wherein the baffles are offset in an alternating pattern.

15. The lid assembly of claim 1, wherein said lid assembly is disposable.

16. The lid assembly of claim 1, wherein said lid assembly is compatible for use with a drinking vessel that is configured for holding and dispensing a drinkable fluid that is one of tea, coffee, soup, shake, juice, and milk.

17. A lid assembly for use with a drinking vessel, said lid assembly comprising:

a lid having a peripheral rim configured for engaging with said drinking vessel;

a dispensing well formed within said lid, said dispensing well being configured for allowing consumption of a beverage contained within an interior of said drinking vessel by a user;

a splash barrier provided at a bottom of the dispensing well;

at least one opening disposed in a side of the dispensing well, said opening being configured for allowing the beverage to flow from the interior of the drinking vessel into the dispensing well when the drinking vessel is tipped for drinking;

a plurality of baffles located on at least one internal surface of the lid, at least one set of the baffles being located on each side of the splash barrier; and a lid insert fixed within an interior of the lid to the bottom of the splash barrier of the dispensing well, the lid insert configured to extend beyond the periphery of the dispensing well to contact said at least one set of the baffles, the lid insert providing a circuitous path that the beverage must follow to flow from the interior of the drinking vessel along a channel between the lid and the insert and out through the dispensing well.

* * * * *